(12) United States Patent
Lindsay (10) Patent No.: US 6,511,250 B2
(45) Date of Patent: Jan. 28, 2003

(54) QUICK RELEASE MECHANISM FOR DETACHABLE HITCH

(76) Inventor: Frederick H Lindsay, 9393 120th La., North, Seminole, FL (US) 33772-2636

( * ) Notice: Subject to any disclaimer, the term of this patent is extended or adjusted under 35 U.S.C. 154(b) by 0 days.

(21) Appl. No.: 09/900,273

(22) Filed: Jul. 6, 2001

(65) Prior Publication Data

US 2002/0015614 A1 Feb. 7, 2002

Related U.S. Application Data

(60) Provisional application No. 60/218,862, filed on Jul. 18, 2000.

(51) Int. Cl.[7] .............................. B25G 3/00; F16B 7/08; F16B 9/00; F16L 41/00; B60D 1/52
(52) U.S. Cl. ..................................... 403/230; 280/456.1
(58) Field of Search ........................ 16/229, 261, 262, 16/386; 52/71, 285.3, 289, 655.1, 656.9; 280/456.1, 491.1, 491.5; 403/230, 240, 231, 256, 257, 321, 324

(56) References Cited

U.S. PATENT DOCUMENTS

| | | | | |
|---|---|---|---|---|
| 3,501,169 A | * | 3/1970 | Nutt, Jr. ................. | 280/491.5 |
| 3,759,547 A | * | 9/1973 | Ankeny ................... | 280/491.5 |
| 3,829,115 A | * | 8/1974 | Rich ........................ | 280/656 |
| 4,204,701 A | * | 5/1980 | Oltrogge ................. | 280/491.5 |
| 5,348,333 A | * | 9/1994 | Gee ......................... | 280/491.5 |
| 5,727,806 A | * | 3/1998 | McCoy et al. ............. | 280/494 |
| 5,755,454 A | * | 5/1998 | Peterson .................. | 280/491.1 |
| 6,357,778 B1 | * | 3/2002 | Ross ........................ | 280/456.1 |
| 6,434,895 B1 | * | 8/2002 | Hosterman et al. ......... | 52/143 |

* cited by examiner

*Primary Examiner*—Robert J. Sandy
*Assistant Examiner*—Ruth C. Rodriguez
(74) *Attorney, Agent, or Firm*—Dennis G. LaPointe; Mason Law, P.A.

(57) ABSTRACT

A quick release mechanism for a detachable hitch assembly used on transport carrier frames has at least two receiving portions attached to a cross-member beam of a transport carrier frame in a spaced-apart relationship, and has corresponding mating portions attached to a detachable hitch assembly. The receiving portion includes a carrier frame attachment plate on the cross-member beam of the transport carrier frame. The mating portions of the hitch assembly are each adapted to include an end plate. Each end plate is adapted to receive a quick disconnect pin at its upper and lower ends. Each carrier frame attachment plate having three portions, a left side and a right side portion with the central portion in between. The left and right sides are also modified to accommodate a quick disconnect pin for interlocking the hitch assembly to the carrier frame.

18 Claims, 10 Drawing Sheets

QUICK RELEASE MECHANISM FOR DETACHABLE HITCH

This application claims the benefit of No. 60/218,862, filed Jul. 18, 2000.

BACKGROUND OF THE INVENTION

1. Field of the Invention

The invention relates to quick release mechanisms for detachable hitches used on heavy duty industrial transport carrier frames, particularly manufactured housing carrier frames.

2. Description of Related Art

Trailer hitch assemblies for industrial transport carrier frames and manufactured housing carrier frames are known in the art. However, in cases where the hitch assemblies are temporarily mounted with flanges and bolts, the removal of such assemblies are very difficult, cumbersome and potentially injurious due to the inherent weight of the steel beam used to manufacture the hitch assemblies.

Hitches in common use today in the mobile home/manufactured housing industry as well as in other industries using carriers require that nuts and bolts be removed from underneath the carrier frame requiring workers to crawl under the hitch assemblies. In some cases where room to crawl underneath is limited and the manufactured housing or mobile home has to be lifted to be placed on a foundation, a crane lifts the manufactured housing or mobile home and while it is elevated, workers dismantle the hitch assembly while standing under the carrier frame.

Generally, each beam used in a prior art hitch assembly is approximately 8 feet long. A 12 inch beam may weigh about 11.8 pounds per linear foot, a 10 inch beam may weigh about 8 pounds per linear foot, and a 8 inch beam may weigh about 6.8 pounds per linear foot. Therefore, after a carrier is in a desired position, removal of the hitch assembly can require the handling of about 200–250 pounds. This often has to be done by one person who must in some cases crawl under the assembly to remove the fastening bolts. A mishap causing temporary disabling injuries is not uncommon.

Figure 1A:
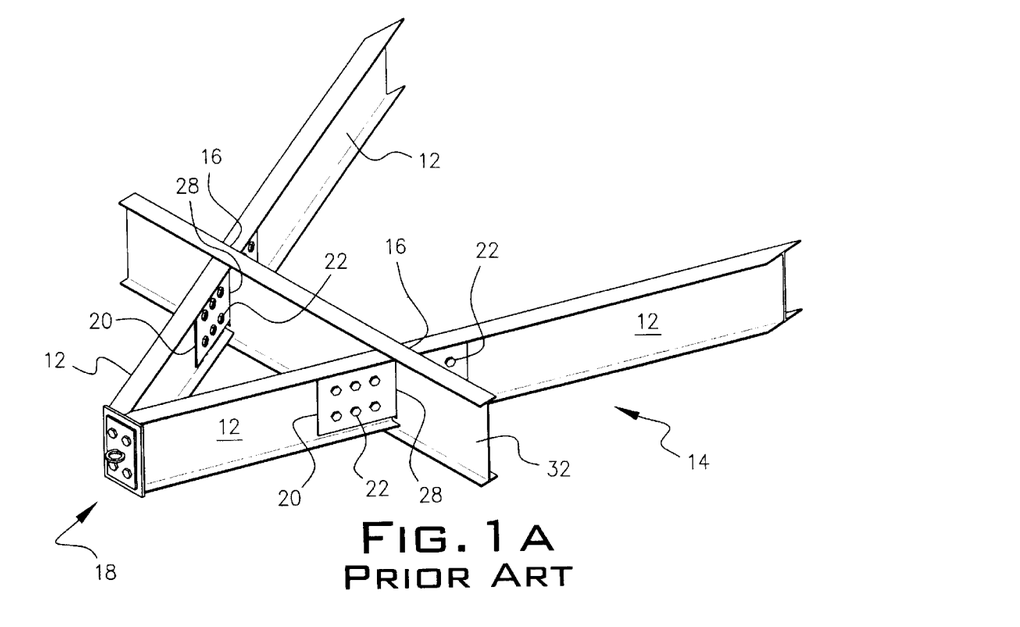
FIG. 1A is a depiction of a typical prior art hitch assembly.
Figure 1B:
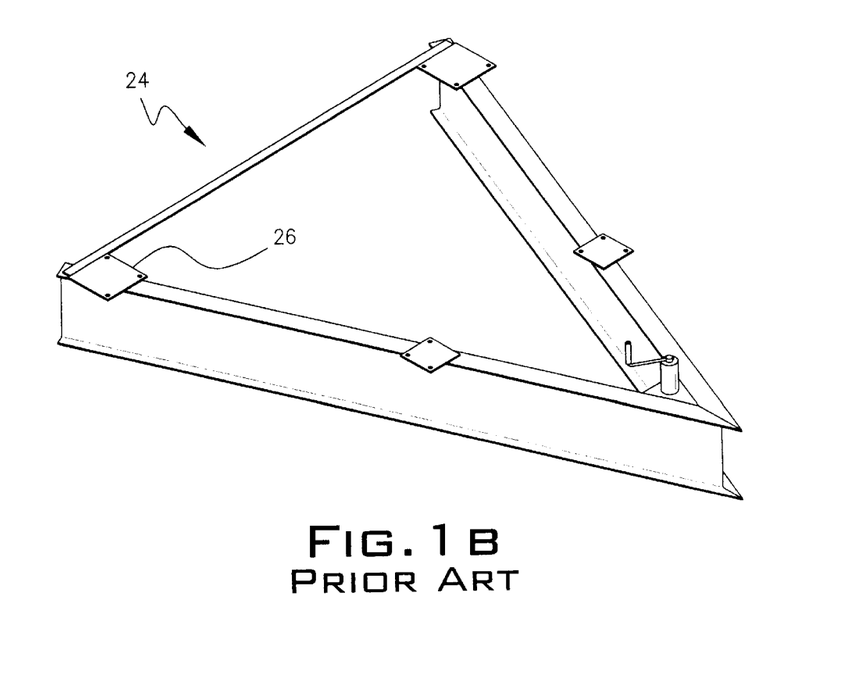
FIG. 1B is a depiction of another typical prior art hitch assembly.
Figure 2A:
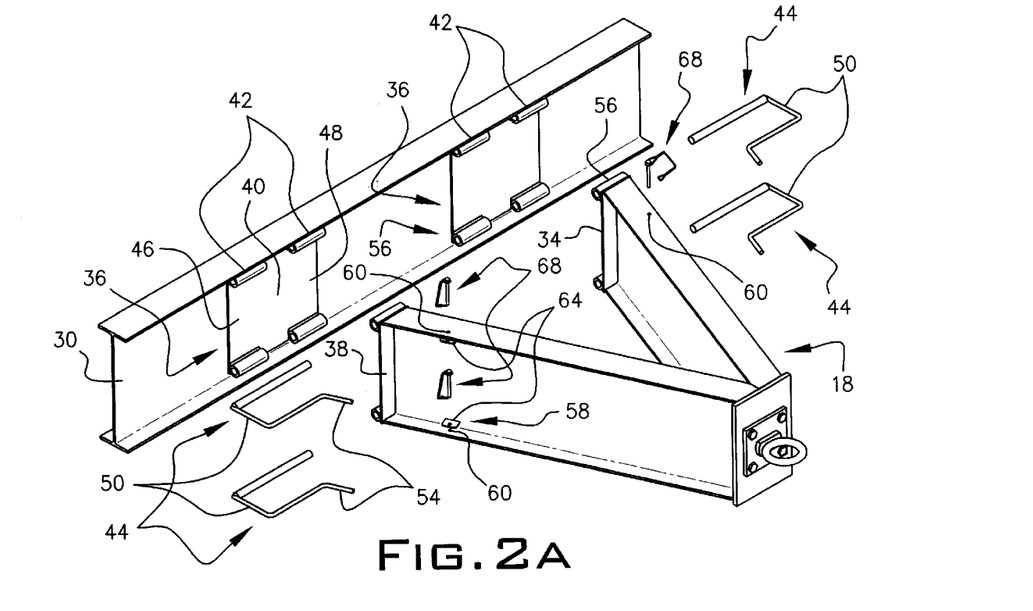
FIG. 2A is a perspective view of one application of the invention with its various components in a state of disassembly.
Figure 2B:
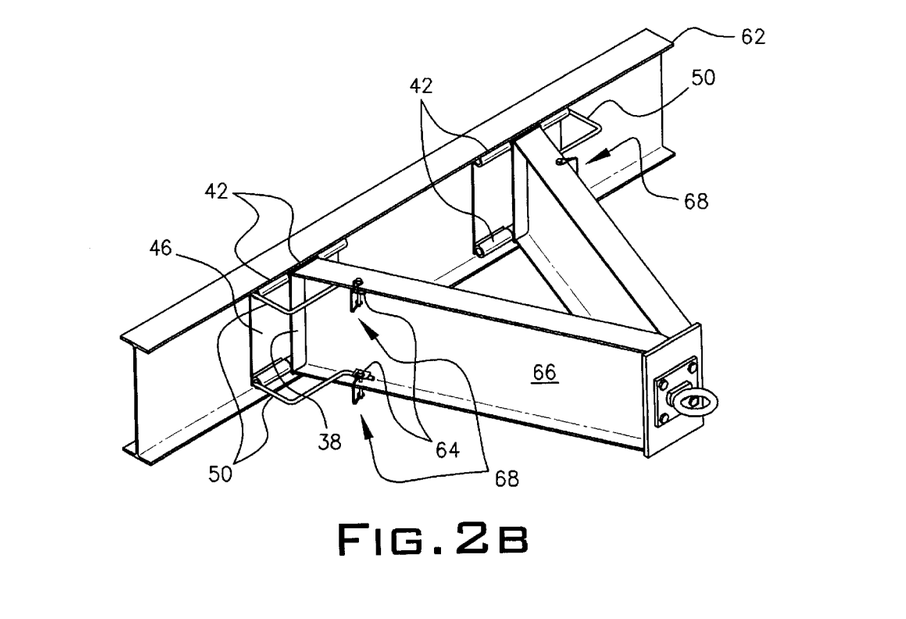
FIG. 2B is a perspective view of the depiction of FIG. 4A in an assembled state.
Figure 3A:
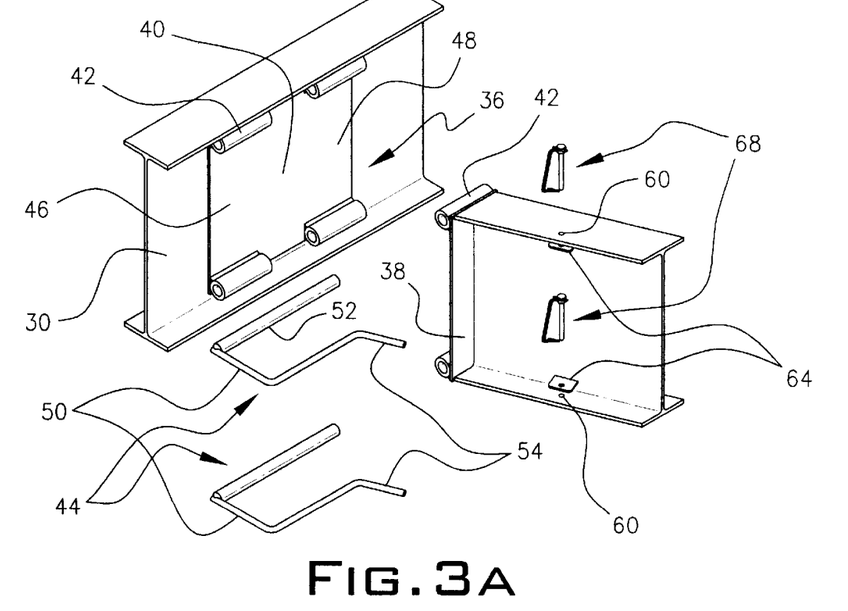
FIG. 3A is a partial exploded view of the depictions shown in FIGS. 2A and 2B in a disassembled state.
Figure 3B:
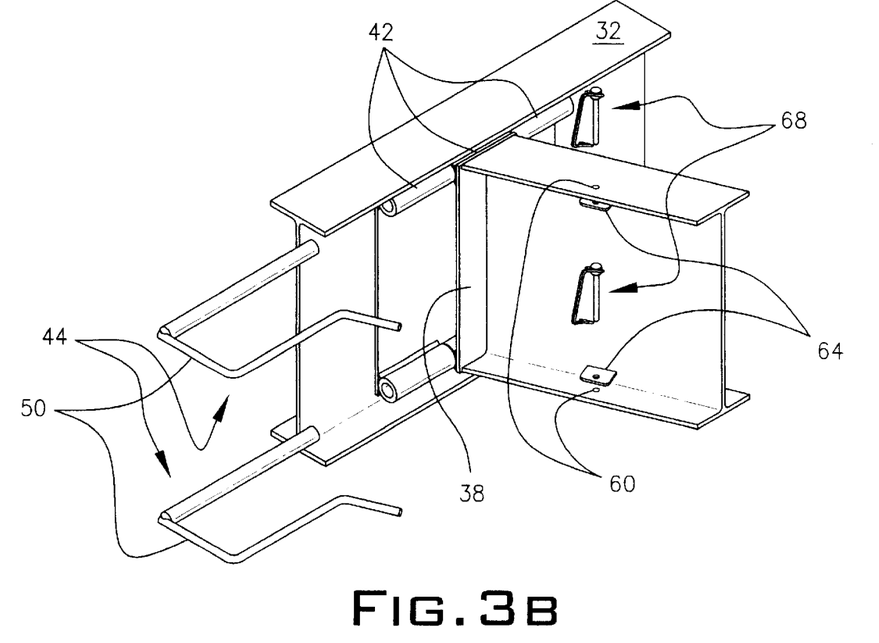
FIG. 3B is a partially assembled depiction of the components in FIG. 3A.
Figure 3C:
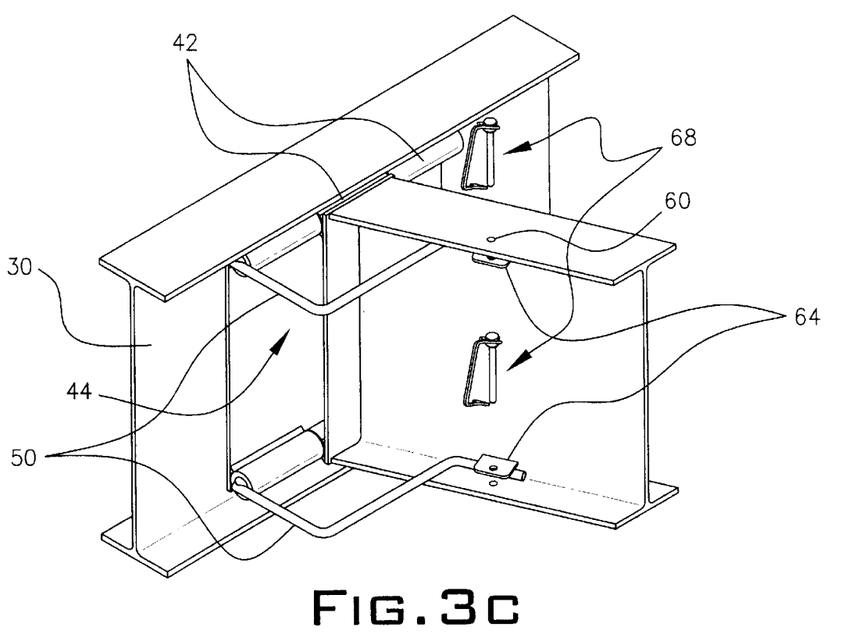
FIG. 3C is a partially assembled view of the depiction shown in FIG. 3B.
Figure 3D:
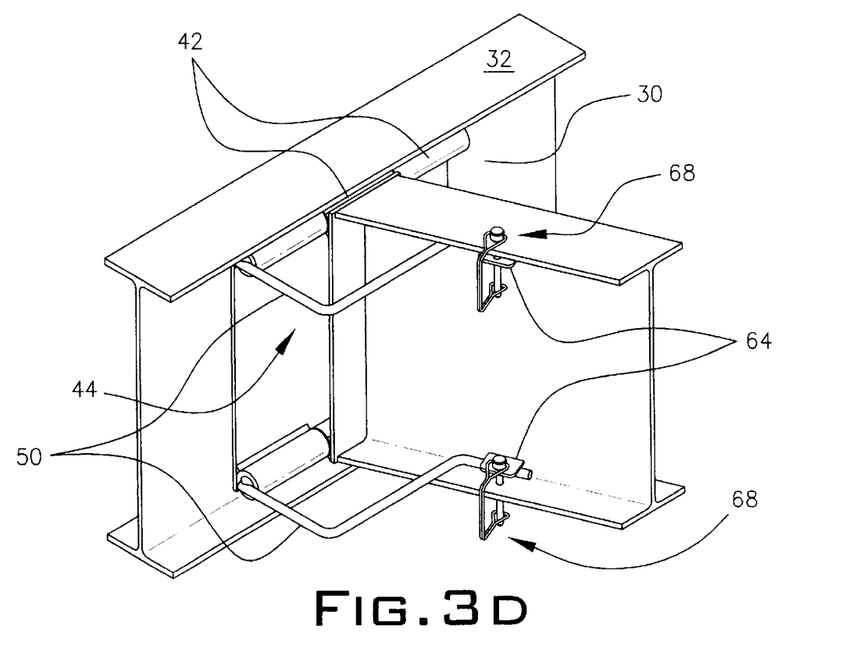
FIG. 3D is a fully assembled view of the depiction of FIG. 3C.
Figure 4A:
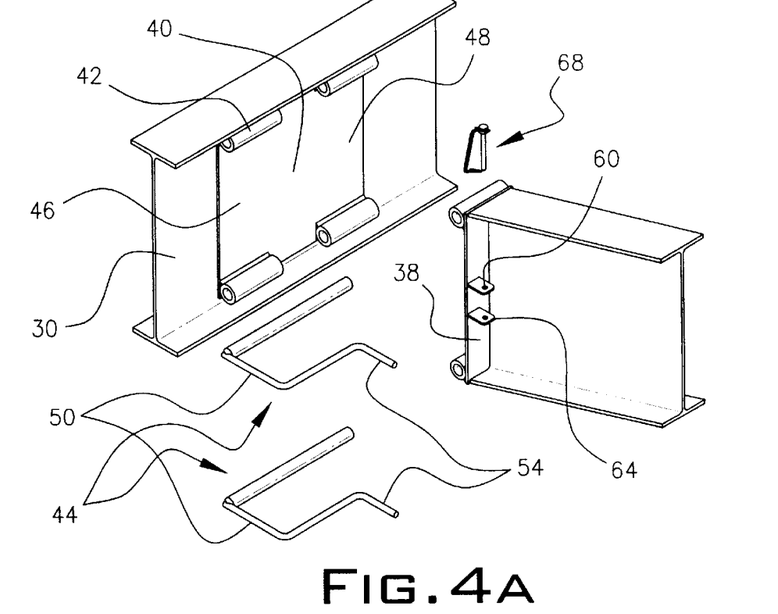
FIG. 4A is a partial exploded view depicting another typical application for securing the handle portion of the quick disconnect pins.
Figure 4B:
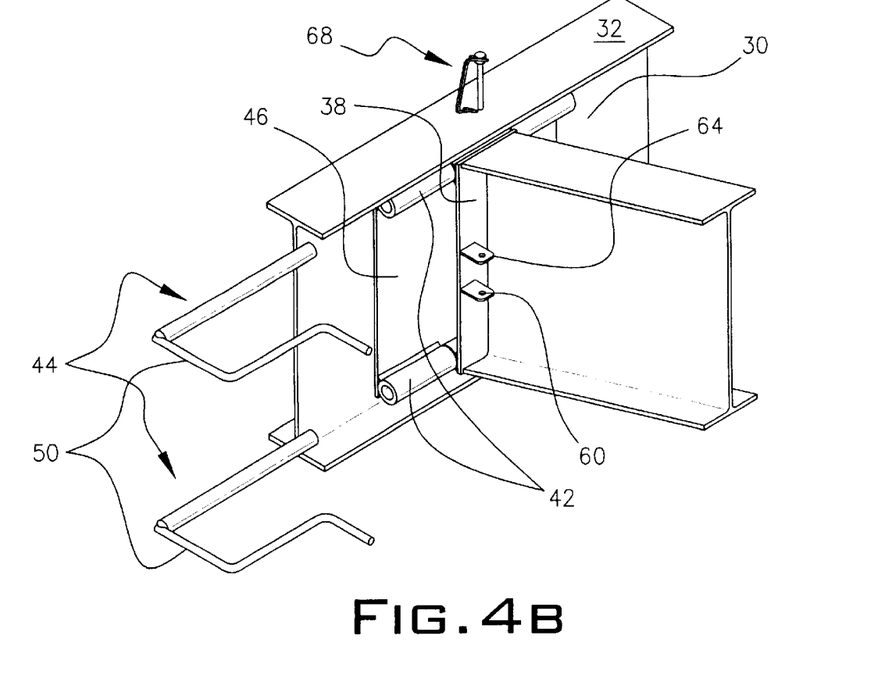
FIG. 4B is a partially assembled view of the depiction shown in FIG. 4A.
Figure 4C:
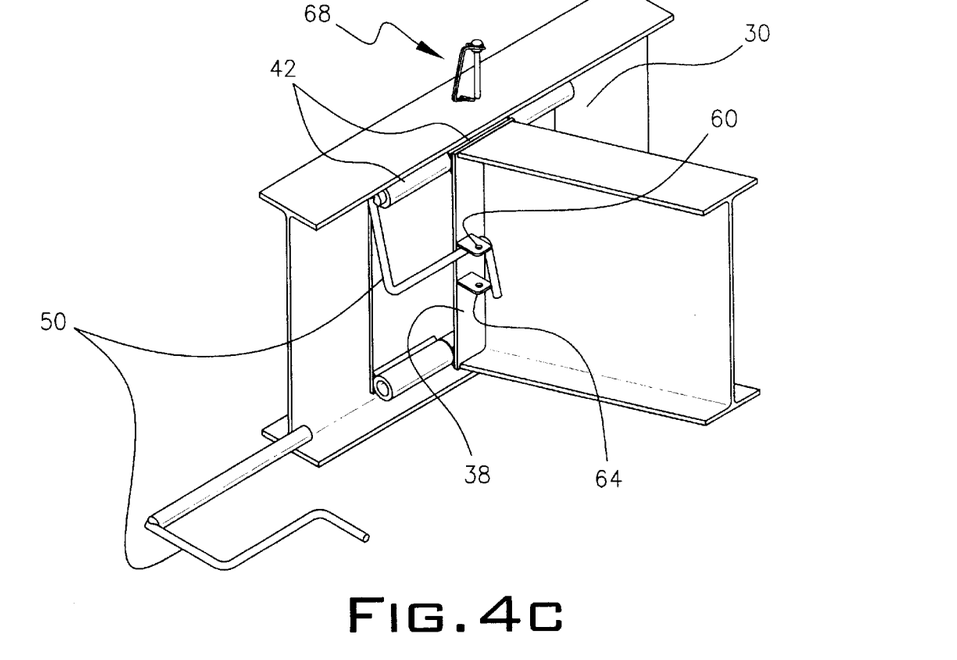
FIG. 4C is a partially assembled view of the depiction of FIG. 4B showing one of the quick disconnect pin handles between the attachment eyelet plates.
Figure 4D:
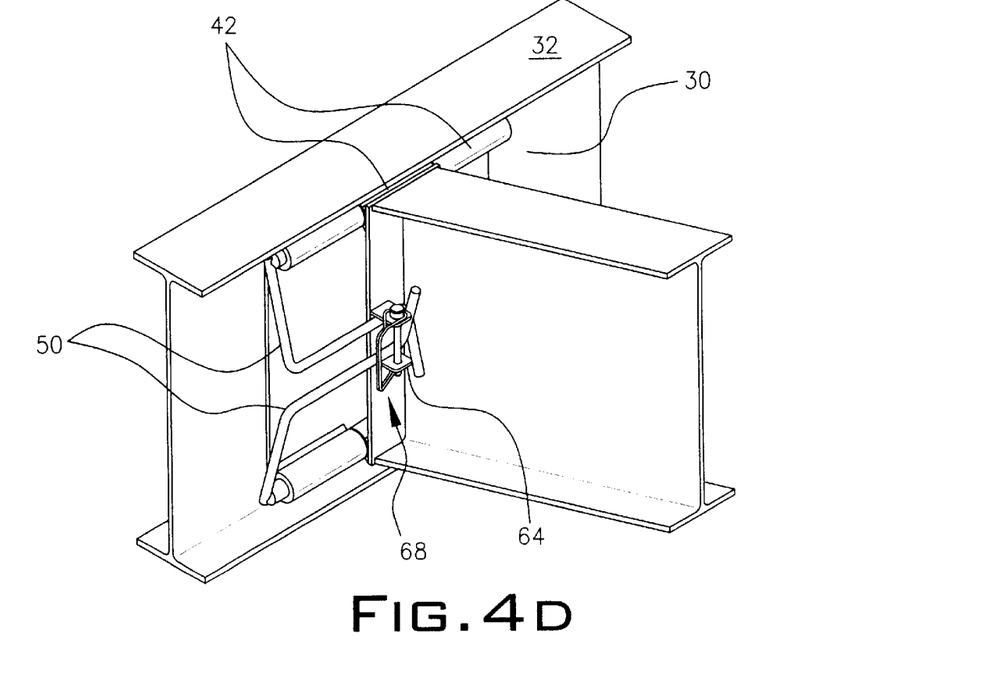
FIG. 4D is an assembled view of the depiction of FIG. 4A.
Figure 5A:
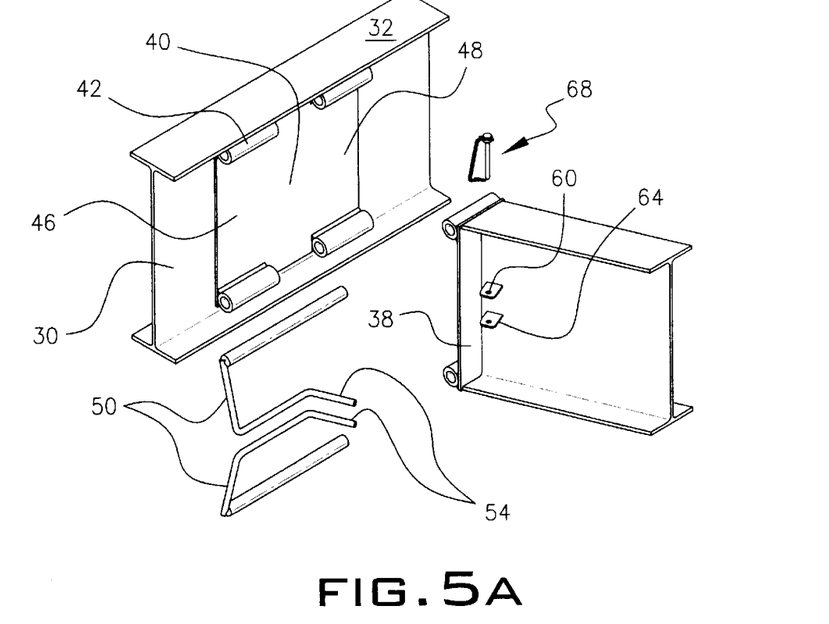
FIG. 5A is a partial exploded view depicting another practical application for securing the handle portion of the quick disconnect pins.
Figure 5B:
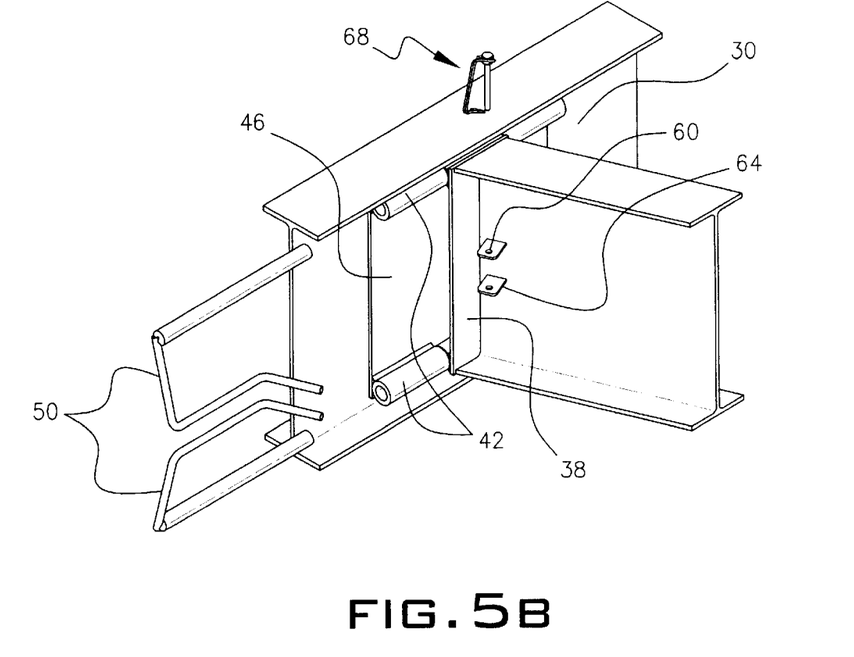
FIG. 5B is a partially assembled view of the depiction of FIG. 5A.
Figure 5C:
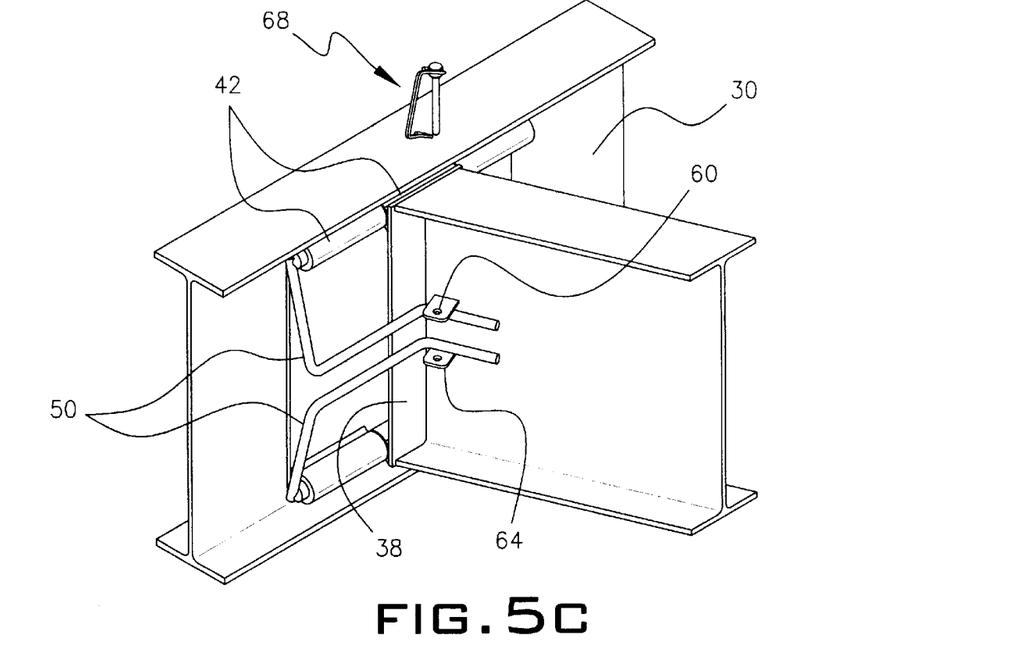
FIG. 5C is a partially assembled view of the depiction of FIG. 5B showing both handles of the quick disconnect pins in position for securing.
Figure 5D:
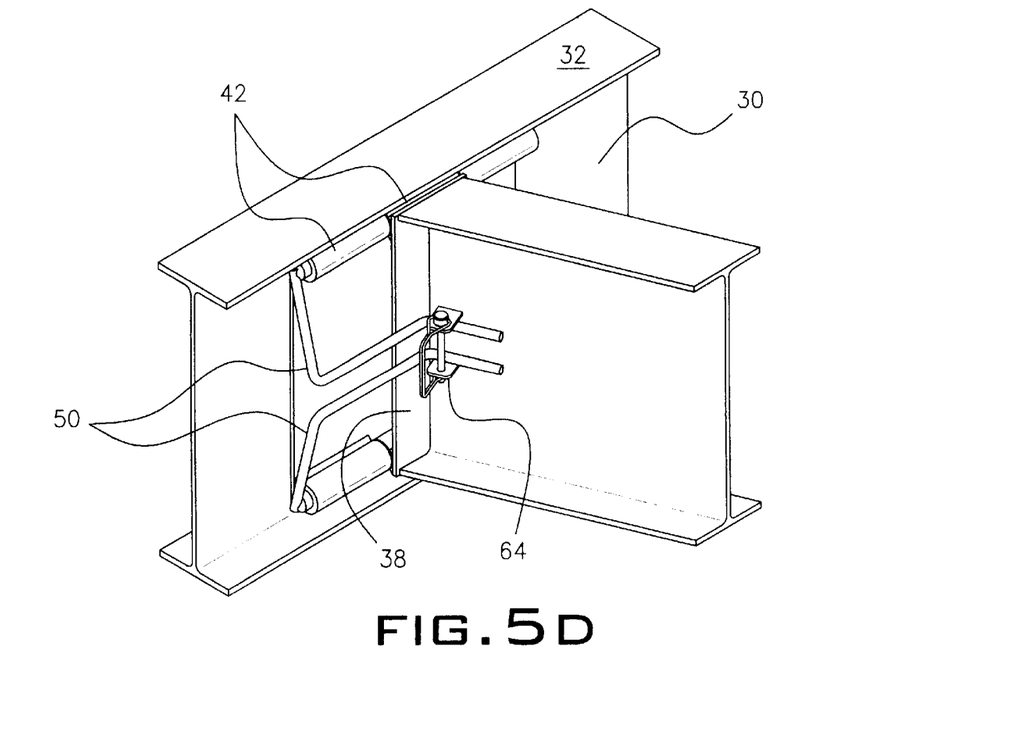
FIG. 5D is an assembled view of the depiction of FIG. 5A.
Figure 6A:
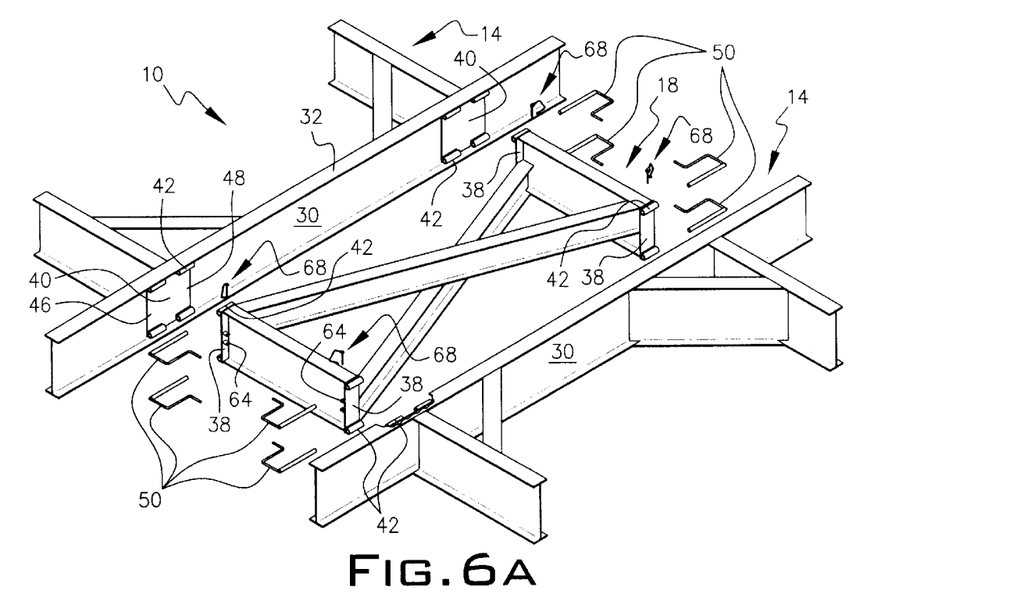
FIG. 6A is a disassembled view of another typical application of the invention where two carrier frames can be hitched together using an X-frame butterfly hitch assembly for piggy-back transportation.
Figure 6B:
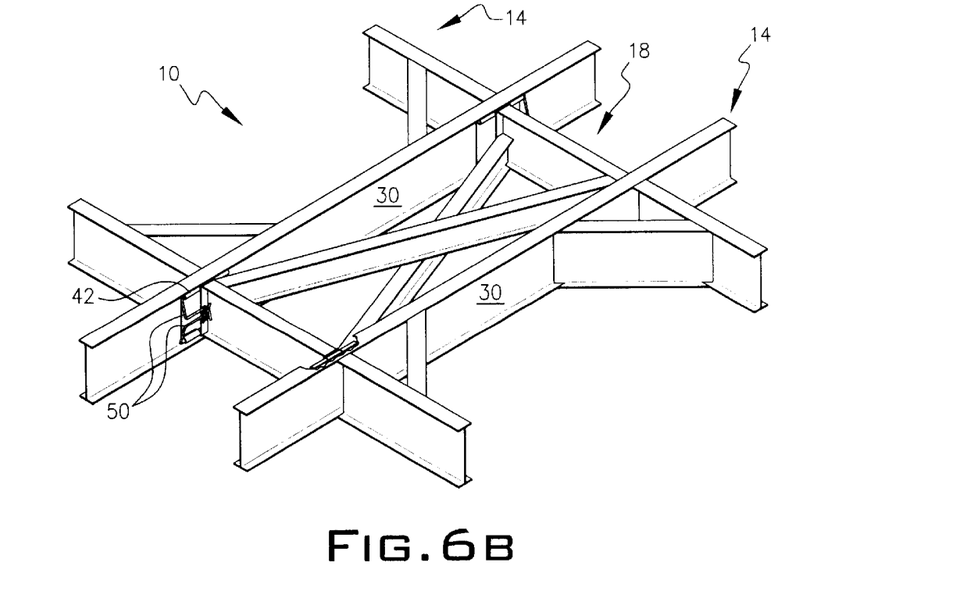
FIG. 6B is an assembled view of the depiction shown in FIG. 6A.

Known related art includes hitch assemblies as depicted in FIGS. 1a and 1b. In FIG. 1a, two of the beam members 12 forming the A-frame of the hitch assembly 18 are cut. The cut legs or beam members 12 are then permanently welded at 16 to the inside of the carrier frame 14, that is, the cross member. Slots 28 are cut in the cross member of the carrier frame 14 and gusset plates 20 are inserted through each slot 28 and 4–6 bolts 22 are used to attach the gusset plates 20 to the beam member 12 inside the carrier frame 14. The gusset plates 20 remain extended forward of the carrier frame 14 so that the hitch tongue portion of the hitch assembly 18 can be bolted to the gusset plates 20. Although this type of hitch assembly provides for a reduced weight assembly, a worker still has to deal with 8–12 bolts in removal of the hitch assembly from the carrier frame.

FIG. 1b depicts another prior art hitch assembly 24, which forms an A-frame with 8–9 foot beams 12 for each leg. The beam upper flanges have flange plates 26 welded at about the end of each beam 12 and at an intermediate location. Each flange plate 26 is placed to line up with a carrier frame 14 cross member where 4 bolts (not shown) are used to secure the hitch assembly 24 under the carrier frame 14.

None of the devices in the above references provide a quick release mechanism which can be used with a reduced weight hitch assembly to provide a safe dismantling of the hitch assembly without having to crawl under the hitch assembly and carrier frame, and which can be used with the above described lower profile carriers using portable axle and tire assemblies. An object of the present invention would provide a device which would be safer to dismantle without having to crawl underneath a carrier frame and would reduce labor costs in the form of time required to separate the tongue portion of a hitch assembly in the field. Where the hitch can be reused again, several hundreds of dollars can be saved by recycling the same hitch assembly for future jobs.

SUMMARY OF THE INVENTION

The present invention is a quick release mechanism for a detachable hitch assembly for use on manufactured housing transport carrier frames, usually subfloors to the manufactured housing. The invention is also adaptable to other heavy industrial transport carrier frames where it is desirable to remove the tongue portion of the hitch assembly. In addition, the invention may be used to interconnect transport carrier frames so they may be transported in tandem.

The invention is a quick release mechanism which takes an A-frame tongue portion of a hitch assembly or an X-frame butterfly hitch assembly, and modifies the end beams, typically I-beams, of the hitch assemblies with end plates. Near the top and bottom of the two ends plates are welded pipe segments horizontally oriented and having a hollow interior to receive a quick disconnect pin, for example, an approximate ¾ inch diameter pin. Although the quick disconnect pin is preferably a round rod, other shapes are contemplated such as square, hexagonal, etc. The hollow interior of the pipe segments would be shaped to correspond to the shape of the pin used.

A hitch assembly attachment plate is then provided which is typically welded to the front face of the carrier frame cross member, thereby essentially making it integral to the carrier frame. The hitch assembly attachment plate also has two welded pipe segments horizontally oriented and having a hollow interior to receive the quick disconnect pin near the top of the hitch assembly attachment plate and two similar welded pipe segments near the bottom of the hitch assembly attachment plate. Each pipe segment on the attachment plate and each on the A-frame end or X-frame end plates are approximately the same length. The pipe segments on the hitch assembly attachment plate are spaced apart to allow the pipe segments on the A-frame or X-frame end plate to be placed between the hitch assembly attachment plate pipe segments so as to form what appears to be a hinge assembly. The hollow interior of each pipe segments are also aligned to receive the quick disconnect pin through the pipe segment starting near one edge of the hitch assembly attachment plate through the pipe segment in the A-frame end or X-frame plate and continue through the pipe segment ending near the other edge of the hitch assembly attachment plate.

In one embodiment of the invention, the hitch assembly attachment plate is not used and the pipe segments normally associated with the hitch assembly attachment plate are instead welded directly to the carrier frame cross member and aligned to receive the quick disconnect pins as described above.

In a typical application of the invention, the hitch assembly attachment plate may be about 12 inches wide by 10.5 inches wide and each pipe segment may typically be about 4 inches long and large enough to accommodate the pin size, usually ¾ inch diameter.

Other size hitch assembly attachment plates and corresponding pipe segment sizes, including pin sizes may be used depending on the workloads and desired safety factors involved.

The quick disconnect pins are typically U-shaped with an outwardly extended handle portion extending from one of the legs of the U-shaped pin. The portions of the U-shaped pin and handle portion which do not extend inside a pipe segment need not be the same diameter as the pin portion entering the interior of the pipe segments. They may be made from smaller bar stock and welded or otherwise attached to the pin portion entering the pipe segments. The pin portion entering the pipe segments are sufficient to allow a relatively snug fit, yet with sufficient tolerance to allow the pin to be inserted and removed with little resistance.

When a quick disconnect pin is inserted to engage the hitch assembly frame end plate to the hitch assembly attachment plate, the handle of the pin is rotated out of the way against an inside flange portion of the hitch frame beam or against the inside surface of the hitch frame end plate. The handle is retained in position with a retainer clip. A pair of retainer clip attachment plates with eyelets are welded so as to extend from a surface of the hitch frame beam, which can be from the inside of the flange or main channel member, or from the inside surface of the end plate. The pair of retainer clip attachment plates are aligned and spaced apart to rotate the handle in between the pair of retainer clip attachment plates so that a pin on the retainer clip may be inserted through one eyelet over the handle and through the second eyelet and the clip then secured to stop the handle from rotating out of position. This means of using a retainer clip can be used for each handle individually or one retainer clip may be used to retain two handles simultaneously.

The materials for the quick release mechanism may be carbon steel, stainless steel and other suitable metallic materials.

BRIEF DESCRIPTION OF THE DRAWING

For a fuller understanding of the nature and objects of the invention, reference should be made to the following detailed description, taken in connection with the accompanying drawings, in which.

DETAILED DESCRIPTION OF THE INVENTION

Referring now to the drawings, in particular FIGS. 2A–2B, 3A–3D, 4A–4D, 5A–5D, 6A–6B and 7A–7B, the invention which is a quick release mechanism for use with hitch assemblies to transport carrier frames and is depicted generally as 10. The quick release mechanism 10 has at least two receiving portions 30 attached to a cross-member beam 32 of a transport carrier frame 14 in a spaced-apart relationship, and having corresponding mating portions attached to a detachable hitch assembly 18.

The receiving portion 30 includes a carrier frame attachment plate 36 which is adapted for fixed attachment to the cross-member beam 32 of the transport carrier frame 14. The mating portions 34 of the detachable hitch assembly 18 are each adapted to include an end plate 38 oriented so as to be in face to face relationship with a central portion 40 of the corresponding carrier frame attachment plate 36.

Each end plate 38 has means 42 for receiving a quick disconnect pin 44 at each of an upper and lower end of each end plate 38, the means 42 for receiving the quick disconnect pin being horizontally oriented. Each carrier frame attachment plate 36 has three portions, a left side 46 and a right side 48 portion with the central portion 40 there between. Each left side 46 and right side 48 portion have means 42 for receiving the respective quick disconnect pin 44 at each of an upper and lower end of each of the left side 46 and right side 48 portions, the means 42 for receiving the quick disconnect pin 44 being horizontally oriented and adapted to align with the corresponding means 42 for receiving the respective quick disconnect pin 44 on the upper and lower ends of the end plate 38 on the detachable hitch assembly 18.

When the respective quick disconnect pins 44 are inserted through the means 42 for receiving the quick disconnect pin 44 in each of the left side 46 and right side 48 of the carrier frame attachment plate 36 and the end plate 38 of the hitch assembly 18 interlocks said hitch assembly 18 to the transport carrier frame 14. The corresponding removal of the quick disconnect pins 44 facilitates the quick release of the detachable hitch assembly 18 from the transport carrier frame 14.

Each quick disconnect pin 44 comprises a generally U-shaped portion 50 having one leg 52 for insertion into and out of the means 42 for receiving the quick disconnect pin 44, and handle means 54 extending from an end of the U-shaped portion 50 of the quick disconnect pin 44 opposite the leg 52 for insertion into and out of the, means 42 for receiving the quick disconnect pin 44.

The quick release mechanism 10 further includes means 56 for retaining the quick disconnect pin 44 in a position that interlocks the hitch assembly 18 with the transport carrier frame 14, and means 58 for securing the means 56 for retaining the quick disconnect pin 44, wherein the means 56 for retaining the quick disconnect pin 44 secures the handle means 54 such that the quick disconnect pin 44 can not be removed from the means 42 for receiving the quick disconnect pin 44 without removal of said means 56 for retaining the quick disconnect pin.

The means 58 for securing the means 56 for retaining the quick disconnect pin 44 typically includes a pair of spaced apart eyelets 60 in between which the handle means 54 is located for securing. One way to provide the eyelets 60 is to locate one of the eyelets 60 in a flange portion 62 of the hitch assembly 18 and the other eyelet 60 is in an attachment plate 64 extending from a beam 66 of the hitch assembly 18. Of course, another alternative embodiment is to have each eyelet 60 located in an attachment plate 64 extending from a beam 66 of the hitch assembly 18.

Figure 7A:
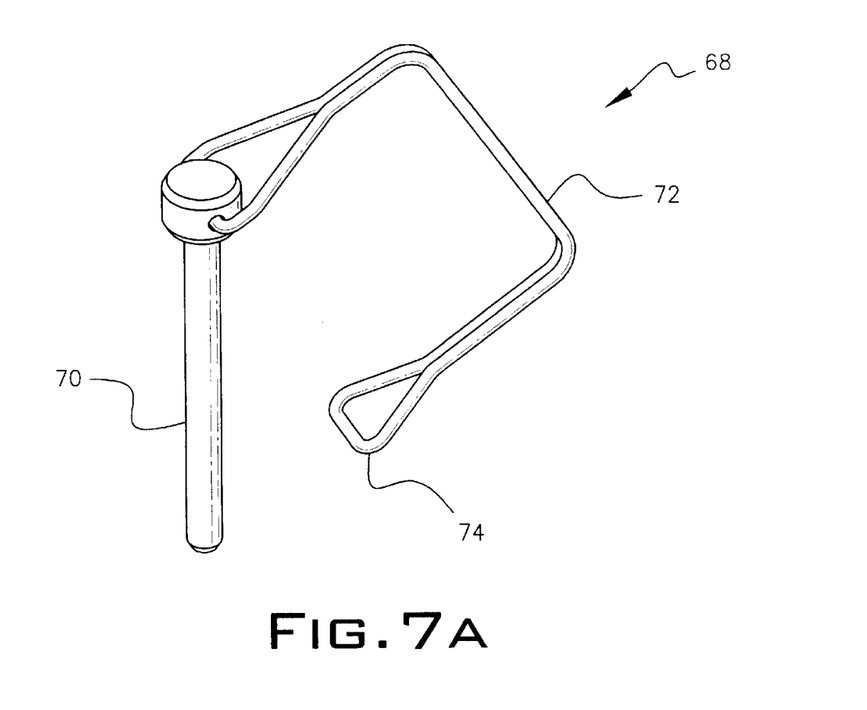
FIG. 7A is a depiction of a typical retainer.
Figure 7B:
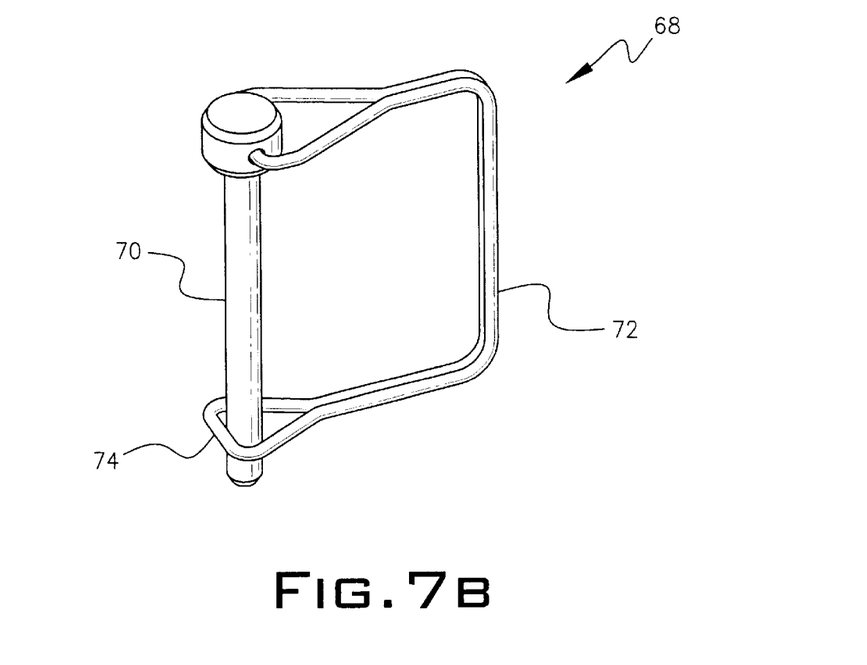
FIG. 7B is a depiction of the retainer clip of FIG. 7A with the clip in a secured position.

Although there are many style pins that can be used as means 58 for securing the means 56 for retaining the quick disconnect pin 44, a simple application may be using a retainer clip 68 where the retainer clip 68 has a pin portion 70 and a clip portion 72 rotatably connected at one end of the pin portion 70. The opposite end of the clip portion 72 includes means 74 for detachable engagement with the opposite end of the pin portion 70. The clip portion 72 typically would have a loop which serves as the means 74 for detachable engagement with the pin portion 70. The clip portion 72 is generally made from a spring type wire that is flexible enough to bend and pull over the pin portion 70 for engagement or to pull away for disengagement.

As seen from the foregoing description, the present invention satisfies a long felt need to provide a quick release device and method for safely connecting and disconnecting hitch assemblies to transport carrier frames.

The invention is clearly new and useful. Moreover, it was not obvious to those of ordinary skill in this art at the time it was made, in view of the prior art considered as a whole as required by law.

It will thus be seen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in the limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A quick release mechanism for a detachable hitch assembly used on transport carrier frames, comprising:
    a quick release mechanism having at least two receiving portions attached to a cross-member beam of a transport carrier frame in a spaced-apart relationship, and having corresponding mating portions attached to a detachable hitch assembly;
    the receiving portion including a carrier frame attachment plate adapted for fixed attachment to the cross-member beam of the transport carrier frame;
    the mating portions of the detachable hitch assembly each being adapted to include an end plate oriented so as to be in face to face relationship with a central portion of the corresponding carrier frame attachment plate;
    each end plate having means for receiving a quick disconnect pin at each of an upper and lower end of each end plate, the means for receiving the quick disconnect pin being horizontally oriented; and
    each carrier frame attachment plate having three portions, a left side and a right side portion with the central portion there between, each left side and right side portion having means for receiving the respective quick disconnect pin at each of an upper and lower end of each of the left side and right side portions, the means for receiving the quick disconnect pin being horizontally oriented and adapted to align with the corresponding means for receiving the respective quick disconnect pin on the upper and lower ends of the end plate on the detachable hitch assembly,
    wherein when the respective quick disconnect pins are inserted through the means for receiving the quick disconnect pin in each of the left side and right side of the carrier frame attachment plate and the end plate of the hitch assembly interlocks said hitch assembly to the transport carrier frame, and
    wherein the corresponding removal of said quick disconnect pins facilitates the quick release of the detachable hitch assembly from the transport carrier frame.

2. The quick release mechanism according to claim 1, wherein each quick disconnect pin comprises:
    a generally U-shaped portion having one leg for insertion into and out of the means for receiving the quick disconnect pin; and
    handle means extending from an end of the U-shaped portion of the quick disconnect pin opposite the leg for insertion into and out of the means for receiving the quick disconnect pin.

3. The quick release mechanism according to claim 2, further comprising:
    means for retaining the quick disconnect pin in a position that interlocks the hitch assembly with the transport carrier frame; and
    means for securing the means for retaining the quick disconnect pin,
    wherein the means for retaining the quick disconnect pin secures the handle means such that the quick disconnect pin can not be removed from the means for receiving the quick disconnect pin without removal of said means for retaining the quick disconnect pin.

4. The quick release mechanism according to claim 3, wherein the means for securing the means for retaining the quick disconnect pin comprises:
    a pair of spaced apart eyelets in between which the handle means is located for securing.

5. The quick release mechanism according to claim 4, wherein one of the eyelets is located in a flange portion of the hitch assembly and the other eyelet is in an attachment plate extending from a beam of the hitch assembly.

6. The quick release mechanism according to claim 4, wherein each eyelet is located in an attachment plate extending from a beam of the hitch assembly.

7. The quick release mechanism according to claim 3, wherein the means for securing the means for retaining the quick disconnect pin is a retainer clip, the retainer clip having a pin portion and a clip portion rotatably connected at one end of the pin portion, an opposite end of the clip portion having means for detachable engagement with the opposite end of the pin portion.

8. A quick release mechanism for a detachable hitch assembly used on transport carrier frames, comprising:

a quick release mechanism having at least two receiving portions attached to a cross-member beam of a transport carrier frame in a spaced-apart relationship, and having corresponding mating portions attached to a detachable hitch assembly;

the receiving portion including a carrier frame attachment plate adapted for fixed attachment to the cross-member beam of the transport carrier frame;

the mating portions of the detachable hitch assembly each being adapted to include an end plate oriented so as be in face to face relationship with a central portion of the corresponding carrier frame attachment plate;

each end plate having means for receiving a quick disconnect pin at each of an upper and lower end of each end plate, the means for receiving the quick disconnect pin being horizontally oriented;

each carrier frame attachment plate having three portions, a left side and a right side portion with the central portion there between, each left side and right side portion having means for receiving the respective quick disconnect pin at each of an upper and lower end of each of the left side and right side portions, the means for receiving the quick disconnect pin being horizontally oriented and adapted to align with the corresponding means for receiving the respective quick disconnect pin on the upper and lower ends of the end plate on the detachable hitch assembly; and each quick disconnect pin including a generally U-shaped portion having one leg for insertion into and out of the means for receiving the quick disconnect pin, and handle means extending from an end of the U-shaped portion of the quick disconnect pin opposite the leg for insertion into and out of the means for receiving the quick disconnect pin, wherein when the respective quick disconnect pins are inserted through the means for receiving the quick disconnect pin in each of the left side and right side of the carrier frame attachment plate and the end plate of the hitch assembly interlocks said hitch assembly to the transport carrier frame, and wherein the corresponding removal of said quick disconnect pins facilitates the quick release of the detachable hitch assembly from the.transport carrier frame.

9. The quick release mechanism according to claim 8, further comprising:

means for retaining the quick disconnect pin in a position that interlocks the hitch assembly with the transport carrier frame; and means for securing the means for retaining the quick disconnect pin, wherein the means for retaining the quick disconnect pin secures the handle means such that the quick disconnect pin can not be removed from the means for receiving the quick disconnect pin without removal of said means for retaining the quick disconnect pin.

10. The quick release mechanism according to claim 9, wherein the means for securing the means for retaining the quick disconnect pin comprises:

a pair of spaced apart eyelets in between which the handle means is located for securing.

11. The quick release mechanism according to claim 10, wherein one of the eyelets is located in a flange portion of the hitch assembly and the other eyelet is in an attachment plate extending from a beam of the hitch assembly.

12. The quick release mechanism according to claim 10, wherein each eyelet is located in an attachment plate extending from a beam of the hitch assembly.

13. The quick release mechanism according to claim 9, wherein the means for securing the means for retaining the quick disconnect pin is a retainer clip, the retainer clip having a pin portion and a clip portion rotatably connected at one end of the pin portion, an opposite end of the clip portion having means for detachable engagement with the opposite end of the pin portion.

14. A quick release mechanism for a detachable hitch assembly used on transport carrier frames, comprising:

a quick release mechanism having at least two receiving portions attached to a cross-member beam of a transport carrier frame in a spaced-apart relationship, and having corresponding mating portions attached to a detachable hitch assembly;

the receiving portion including a carrier frame attachment plate adapted for fixed attachment to the cross-member beam of the transport carrier frame;

the mating portions of the detachable hitch assembly each being adapted to include an end plate oriented so as be in face to face relationship with a central portion of the corresponding carrier frame attachment plate;

each end plate having means for receiving a quick disconnect pin at each of an upper and lower end of each end plate, the means for receiving the quick disconnect pin being horizontally oriented;

each carrier frame attachment plate having three portions, a left side and a right side portion with the central portion there between, each left side and right side portion having means for receiving the respective quick disconnect pin at each of an upper and lower end of each of the left side and right side portions, the means for receiving the quick disconnect pin being horizontally oriented and adapted to align with the corresponding means for receiving the respective quick disconnect pin on the upper and lower ends of the end plate on the detachable hitch assembly;

each quick disconnect pin including a generally U-shaped portion having one leg for insertion into and out of the means for receiving the quick disconnect pin, and handle means extending from an end of the U-shaped portion of the quick disconnect pin opposite the leg for insertion into and out of the means for receiving the quick disconnect pin;

means for retaining the quick disconnect pin in a position that interlocks the hitch assembly with the transport carrier frame; and means for securing the means for retaining the quick disconnect pin, wherein the means for retaining the quick disconnect pin secures the handle means such that the quick disconnect pin can not be removed from the means for receiving the quick disconnect pin without removal of said means for retaining the quick disconnect pin, wherein when the respective quick disconnect pins are inserted through the means for receiving the quick disconnect pin in each of the left side and right side of the carrier frame attachment plate and the end plate of the hitch assembly interlocks said hitch assembly to the transport carrier frame, and wherein the corresponding removal of said quick disconnect pins facilitates the quick release of the detachable hitch assembly from the transport carrier frame.

15. The quick release mechanism according to claim 14, wherein the means for securing the means for retaining the quick, disconnect pin comprises:

a pair of spaced apart eyelets in between which the handle means is located for securing.

16. The quick release mechanism according to claim 15, wherein one of the eyelets is located in a flange portion of the hitch assembly and the other eyelet is in an attachment plate extending from a beam of the hitch assembly.

17. The quick release mechanism according to claim 15, wherein each eyelet is located in an attachment plate extending from a beam of the hitch assembly.

18. The quick release mechanism according to claim 14, wherein the means for securing the means for retaining the quick disconnect pin is a retainer clip, the retainer clip having a pin portion and a clip portion rotatably connected at one end of the pin portion, an opposite end of the clip portion having means for detachable engagement with the opposite end of the pin portion.

* * * * *